US012730454B2

(12) United States Patent
Urano et al.

(10) Patent No.: US 12,730,454 B2
(45) Date of Patent: Sep. 8, 2026

(54) MOBILITY SERVICE SYSTEM

(71) Applicant: TOYOTA JIDOSHA KABUSHIKI KAISHA, Toyota (JP)

(72) Inventors: Hiromitsu Urano, Numazu (JP); Ryo Shirono, Sunto-gun (JP); Takefumi Goto, Gotemba (JP); Shinya Ohkawa, Matsuyama (JP); Fumihiro Ishikawa, Susono (JP); Hiromitsu Kobayashi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 4 days.

(21) Appl. No.: 18/821,325

(22) Filed: Aug. 30, 2024

(65) Prior Publication Data

US 2025/0076883 A1 Mar. 6, 2025

(30) Foreign Application Priority Data

Sep. 4, 2023 (JP) ................................. 2023-142961

(51) Int. Cl.
*G05D 1/227* (2024.01)
*G05D 1/224* (2024.01)
*G05D 109/10* (2024.01)

(52) U.S. Cl.
CPC ........... *G05D 1/2244* (2024.01); *G05D 1/227* (2024.01); *G05D 2109/10* (2024.01)

(58) Field of Classification Search
CPC .. G05D 1/2244; G05D 1/227; G05D 2109/10; G05D 2105/22; G05D 2107/13; G05D 1/2279
See application file for complete search history.

(56) References Cited

U.S. PATENT DOCUMENTS

2002/0196927 A1* 12/2002 Johnson ................ H04M 3/523 379/265.02
2007/0094029 A1 4/2007 Saito et al.
2022/0357738 A1 11/2022 Adachi et al.
2022/0413489 A1* 12/2022 Nakano .................. H04W 4/44
2023/0062744 A1 3/2023 Hasebe
2024/0184303 A1 6/2024 Nagura et al.

FOREIGN PATENT DOCUMENTS

JP 2020-005123 A 1/2020
JP 2022-130022 A 9/2022
JP 2022-172948 A 11/2022
JP 2023-011353 A 1/2023
JP 2023-031788 A 3/2023
WO 2006/070566 A1 7/2006

* cited by examiner

*Primary Examiner* — Russell Frejd
*Assistant Examiner* — Chanmin Park
(74) *Attorney, Agent, or Firm* — Dinsmore & Shohl LLP

(57) ABSTRACT

A mobility service system provides a mobility service using a vehicle. The mobility service system includes one or more processors configured to assign a remote operator to a target vehicle in response to a request for remote support from the target vehicle. The remote support includes service support different from support of vehicle driving. When the remote support requested from the target vehicle is the service support, the one or more processors are further configured to execute a notification waiting process that prohibits a notification related to the service support from being issued to a passenger in the target vehicle until the remote operator is assigned to the target vehicle.

4 Claims, 6 Drawing Sheets

1: MOBILITY SERVICE SYSTEM

MOBILITY SERVICE SYSTEM

CROSS-REFERENCES TO RELATED APPLICATION

The present disclosure claims priority to Japanese Patent Application No. 2023-142961, filed on Sep. 4, 2023, the contents of which application are incorporated herein by reference in their entirety.

TECHNICAL FIELD

The present disclosure relates to a mobility service system that provides a mobility service using a vehicle.

BACKGROUND ART

Patent Literature 1 discloses a remote support device for remotely supporting an autonomous driving vehicle. The remote support for the autonomous driving vehicle is performed at a support point by an operator. When there is no available operator or when it is predicted that there will be no available operator, the remote support device controls driving of the autonomous driving vehicle so as to secure an available operator at the support point.

LIST OF RELATED ART

Patent Literature 1: Japanese Laid-Open Patent Application No. JP-2023-11353

SUMMARY

Remote support for a vehicle performed by a remote operator is known. In general remote support, a remote operator carries out recognition and determination regarding vehicle driving in place of a driving entity (a driver or an autonomous driving system) of a vehicle. That is, the general remote support provides support of vehicle driving.

Here, a mobility service using a vehicle will be considered. In the case of the mobility service, a remote operator may be requested to perform various operations or passenger supports in place of a conductor. That is, the remote support in the case of the mobility service may include not only support of vehicle driving but also service support performed in place of a conductor. Such the service support has not been sufficiently considered in the past.

For example, there may be no available remote operator at a timing when service support is requested from a vehicle. In that case, a passenger in the vehicle may feel senses of anxiety or strangeness.

An aspect of the present disclosure is directed to a mobility service system for providing a mobility service using a vehicle.

The mobility service system includes one or more processors configured to assign a remote operator to a target vehicle in response to a request for remote support from the target vehicle.

The remote support includes service support different from support of vehicle driving.

When the remote support requested from the target vehicle is the service support, the one or more processors are configured to execute a notification waiting process that prohibits a notification related to the service support from being issued to a passenger in the target vehicle until the remote operator is assigned to the target vehicle.

According to the present disclosure, the notification waiting process is executed when the remote support requested from the target vehicle that provides the mobility service is the service support. In the notification waiting process, the notification related to the service support is prohibited from being issued to the passenger in the target vehicle until the remote operator is assigned to the target vehicle. Thus, a gap between a timing of the notification related to the service support and an execution timing of the service support is suppressed. As a result, it is possible to suppress the senses of anxiety and strangeness felt by the passenger in the target vehicle.

DETAILED DESCRIPTION

1. Mobility Service System

1-1. Overview

Figure 1:
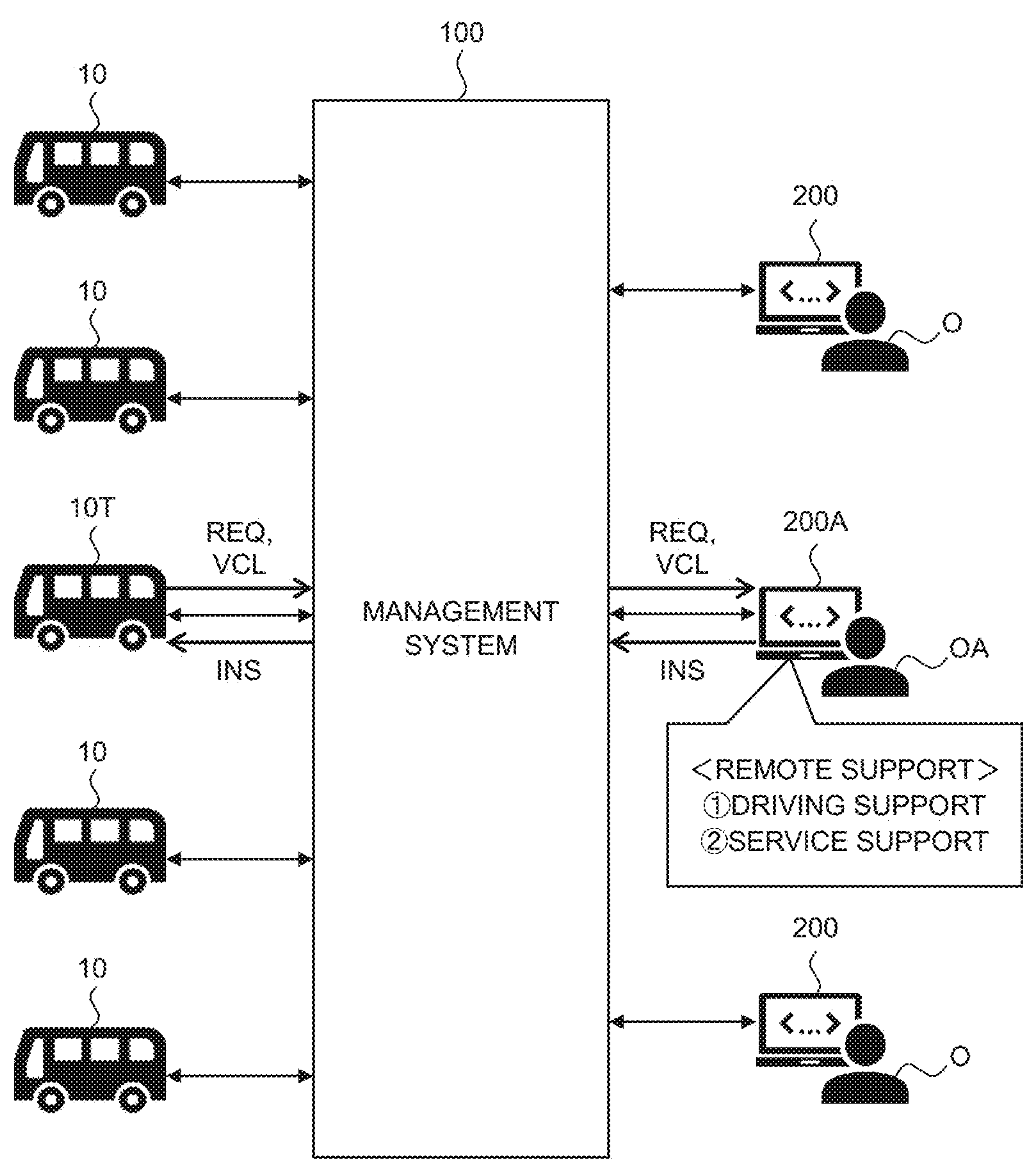
FIG. 1 is a conceptual diagram for explaining an overview of a mobility service system.

FIG. 1 is a conceptual diagram for explaining an overview of a mobility service system 1 according to the present embodiment. The mobility service system 1 provides a mobility service to a user by using a vehicle 10. The vehicle 10 may be referred to as a MaaS (Mobility as a Service) vehicle. For example, the vehicle 10 is an autonomous driving vehicle that autonomously travels. The vehicle 10 may be driven by a driver. Typically, the vehicle 10 travels with a user (passenger). The vehicle 10 may be a bus. A plurality of vehicle 10 are used in one service area.

The mobility service system 1 includes a management system 100 that manages the mobility service. The management system 100 is capable of communicating with the vehicle 10, collects a variety of information from the vehicle 10, and transmits a variety of commands to the vehicle 10. For example, the management system 100 manages an operation schedule and an operation state of the vehicle 10. Typically, the management system 100 is a management server on a cloud. The management server may be configured by a plurality of servers that perform distributed processing.

According to the present embodiment, remote support for the vehicle 10 is performed by a remote operator O as necessary. To that end, the mobility service system 1 further includes a remote operator terminal 200. The remote operator terminal 200 is a terminal device used by the remote operator O when performing the remote support for the vehicle 10. The remote operator terminal 200 includes an input device for receiving an input from the remote operator O and an output device for presenting a variety of information to the remote operator O. Examples of the input device include a touch panel, a keyboard, a button, a microphone, and the like. Examples of the output device include a display, a speaker, and the like. The remote operator terminal 200 can also be referred to as a remote support human machine interface (HMI). The management system 100 is capable of communicating with the remote operator terminal 200. The management system 100 further manages the remote support and the remote operator O.

More specifically, when it is determined that the remote support is necessary, the vehicle 10 transmits a "support request REQ" for requesting the remote support to the management system 100. The vehicle 10 that issues the support request REQ, that is, the vehicle 10 that requires the remote support is hereinafter referred to as a "target vehicle 10T."

In response to the support request REQ from the target vehicle 10T, the management system 100 assigns any remote operator O to the target vehicle 10T. This process is hereinafter referred to as an "operator assignment process." An "assigned operator OA" is the remote operator O assigned to the target vehicle 10T. An "assigned operator terminal 200A" is the remote operator terminal 200 operated by the assigned operator OA. The management system 100 manages the target vehicle 10T and the assigned operator OA (the assigned operator terminal 200A) in association with each other.

The management system 100 transmits an assignment notification including the support request REQ and information on the target vehicle 10T to the assigned operator terminal 200A. The assigned operator node 200A presents the assignment notification to the assigned operator OA. The assigned operator OA recognizes that the assigned operator OA is assigned to the target vehicle 10T and starts the remote support with respect to the target vehicle 10T.

During the remote support, the target vehicle 10T and the assigned operator terminal 200A communicate with each other via the management system 100. The target vehicle 10T transmit vehicle information VCL to the assigned operator terminal 200A. The vehicle information VCL includes a state of the target vehicle 10T, an image taken by a camera mounted on the target vehicle 10T, and the like. The assigned operator terminal 200A presents the vehicle information VCL received from the target vehicle 10T to the assigned operator OA. For example, the assigned operator terminal 200A displays the image taken by the camera mounted on the target vehicle 10T on a display device.

The assigned operator OA carries out the remote support for the target vehicle 10T by viewing the vehicle information VCL. An operator instruction INS is an instruction to the target vehicle 10T input by the assigned operator OA. The assigned operator terminal 200A receives input of the operator instruction INS from the assigned operator OA, and transmits the input operator instruction INS to the target vehicle 10T. The target vehicle 10T receives the operator instruction INS from the assigned operator terminal 200A and performs vehicle control in accordance with the received operator instruction INS.

As an example, a case where the vehicle 10 is an autonomous driving vehicle will be considered. The vehicle 10 during the autonomous driving executes a variety of vehicular processes. Examples of typical vehicular processes executed during the autonomous driving are as follows.

(1) Recognition process: the vehicle 100 recognizes a situation around the vehicle 100 by using a recognition sensor. For example, the vehicle 100 uses the camera to recognize signal indication of a traffic signal (e.g., green light, yellow light, red light, right-turn, etc.).

(2) Action decision process: the vehicle 100 decides, based on a result of the recognition process, whether or not to execute an action. Examples of the action include start, stop, right turn, left turn, lane change, and the like.

(3) Timing decision process: the vehicle 100 decides an execution timing at which the action is executed.

Typically, a situation in which the remote support by the remote operator O is necessary is a situation in which the autonomous driving is difficult, that is, a situation in which at least one of the vehicular processes described above is difficult. When the autonomous driving is difficult, the target vehicle 10T issues the support request REQ. The assigned operator OA supports at least one of the recognition process, the action decision process, and the timing decision process described above. For example, the assigned operator OA instructs the target vehicle 10T to start moving.

1-2. Configuration Example of Vehicle

Figure 2:
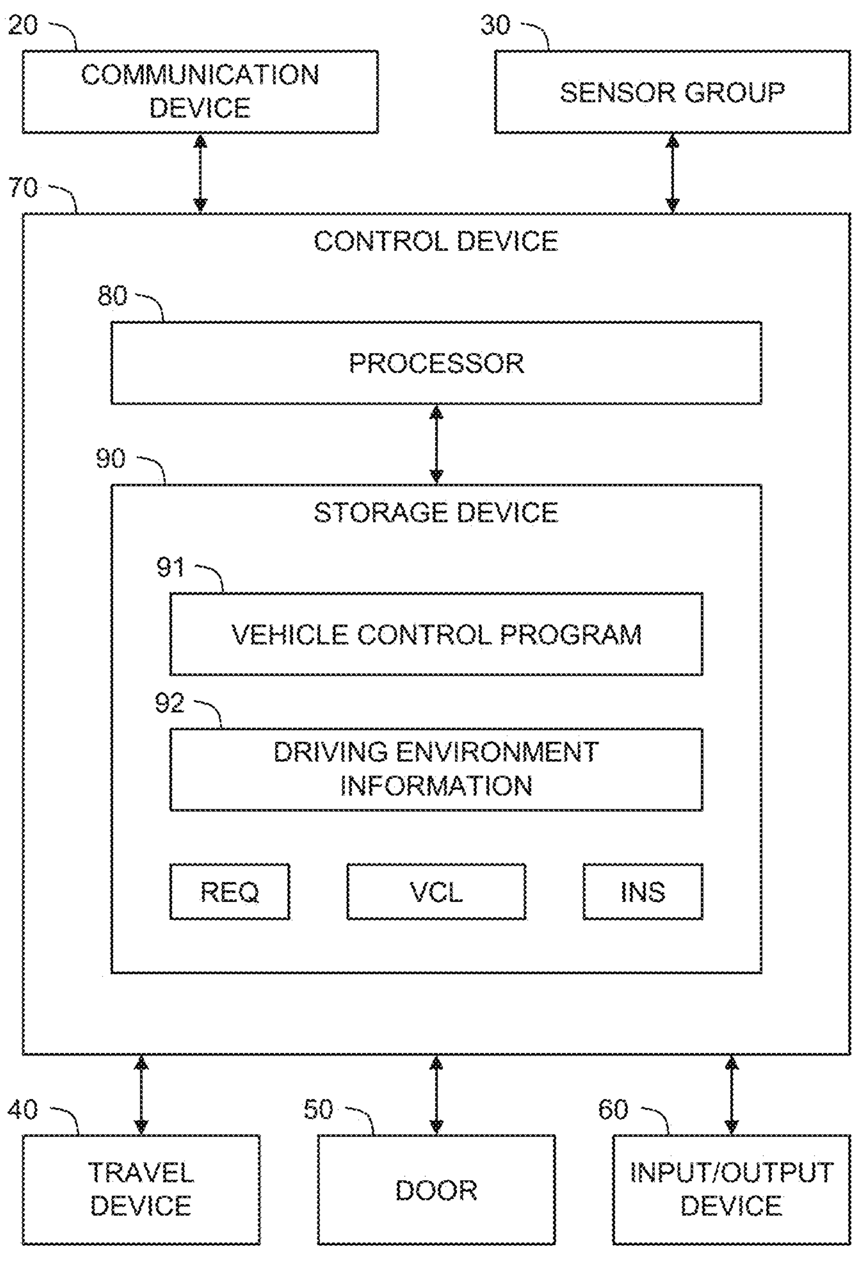
FIG. 2 is a block diagram showing an example of a configuration of a vehicle.

FIG. 2 is a block diagram showing a configuration example of the vehicle 10. The vehicle 10 includes a communication device 20, a sensor group 30, a travel device 40, a door 50, an input/output device 60, and a control device 70.

The communication device 20 communicates with the management system 100 and the remote operator terminal 200.

The sensor group 30 includes a recognition sensor, a vehicle state sensor, a position sensor, and the like. The recognition sensor recognizes (detects) a situation around the vehicle 10. Examples of the recognition sensor include a camera, a laser imaging detection and ranging (LIDAR), a radar, and the like. The vehicle state sensor detects a state of the vehicle 10. The vehicle state sensor includes a speed sensor, an acceleration sensor, a yaw rate sensor, a steering angle sensor, and the like. The position sensor detects a position and an orientation of the vehicle 10. For example, the position sensor includes a GNSS.

The sensor group 30 further includes an interior camera that captures an image of a situation in a vehicle cabin of the vehicle 10.

The travel device 40 includes a steering device, a driving device, and a braking device. The steering device steers the wheels. For example, the steering device includes a power steering device. The drive device is a power source that generates a driving force. Examples of the drive device include an engine, an electric motor, and an in-wheel motor. The braking device generates a braking force.

The input/output device 60 includes an output device for presenting a variety of information to a passenger in the vehicle cabin of the vehicle 10. Examples of the output device include a display, a speaker, and the like. The input/output device 60 includes an input device for receiving a variety of inputs from the passenger in the vehicle cabin of the vehicle 10. Examples of the input device include a touch panel, a microphone, and the like.

The control device (controller) 70 is a computer that controls the vehicle 10. The control device 70 includes one or more processors 80 (hereinafter, simply referred to as a processor 80 or processing circuitry) and one or more storage devices 90 (hereinafter, simply referred to as a storage device 90). The processor 80 executes a variety of processing. For example, the processor 80 includes a CPU. The storage device 90 stores a variety of information. Examples of the storage device 90 include a volatile memory, a nonvolatile memory, an HDD, an SSD, and the like.

A vehicle control program 91 is a computer program executed by the processor 80. The functions of the control device 70 may be implemented by a cooperation between the processor 80 executing the vehicle control program 91 and the storage device 90. The vehicle control program 91 is stored in the storage device 90. Alternatively, the vehicle control program 91 may be recorded on a non-transitory computer-readable recording medium.

The control device 70 uses the sensor group 30 to acquire driving environment information 92 indicating a driving environment for the vehicle 10. The driving environment information 92 includes surrounding situation information indicating a result of the recognition by the recognition sensor. For example, the surrounding situation information includes the image captured by the camera. The surrounding situation information may include object information regarding an object around the vehicle 10. The driving environment information 92 includes vehicle state information indicating the vehicle state detected by the vehicle state sensor. Further, the driving environment information 92 includes vehicle position information indicating the position and the orientation of the vehicle 10.

The control device 70 executes vehicle travel control that controls travel of the vehicle 10. The vehicle travel control includes steering control, drive control, and braking control. The control device 70 executes the vehicle travel control by controlling the travel device 40. The control device 70 may execute autonomous driving control based on the driving environment information 92. More specifically, the control device 70 executes the recognition process, the action decision process, and the timing decision process described above based on the driving environment information 92. Then, the control device 70 executes the vehicle travel control so as to achieve the action.

The control device 70 controls opening and closing of the door 50.

The control device 70 presents a variety of information to the passenger and receives a variety of input from the passenger via the input/output device 60.

When the remote support for the vehicle 10 is performed, the control device 70 communicates with the management system 100 and the remote operator terminal 200 via the communication device 20. When it is determined that remote support is necessary, the control device 70 transmits the support request REQ to the management system 100. Moreover, the control device 70 transmits the vehicle information VCL. The vehicle information VCL, which is information necessary for the remote support performed by the remote operator O, includes at least a part of the driving environment information 92 described above. For example, the vehicle information VCL includes the image taken by the camera. The vehicle information VCL may further include the vehicle state information, the vehicle position information, and the like. The control device 70 receives the operator instruction INS and executes the vehicle control in accordance with the operator instruction INS.

1-3. Configuration Example of Management System

Figure 3:
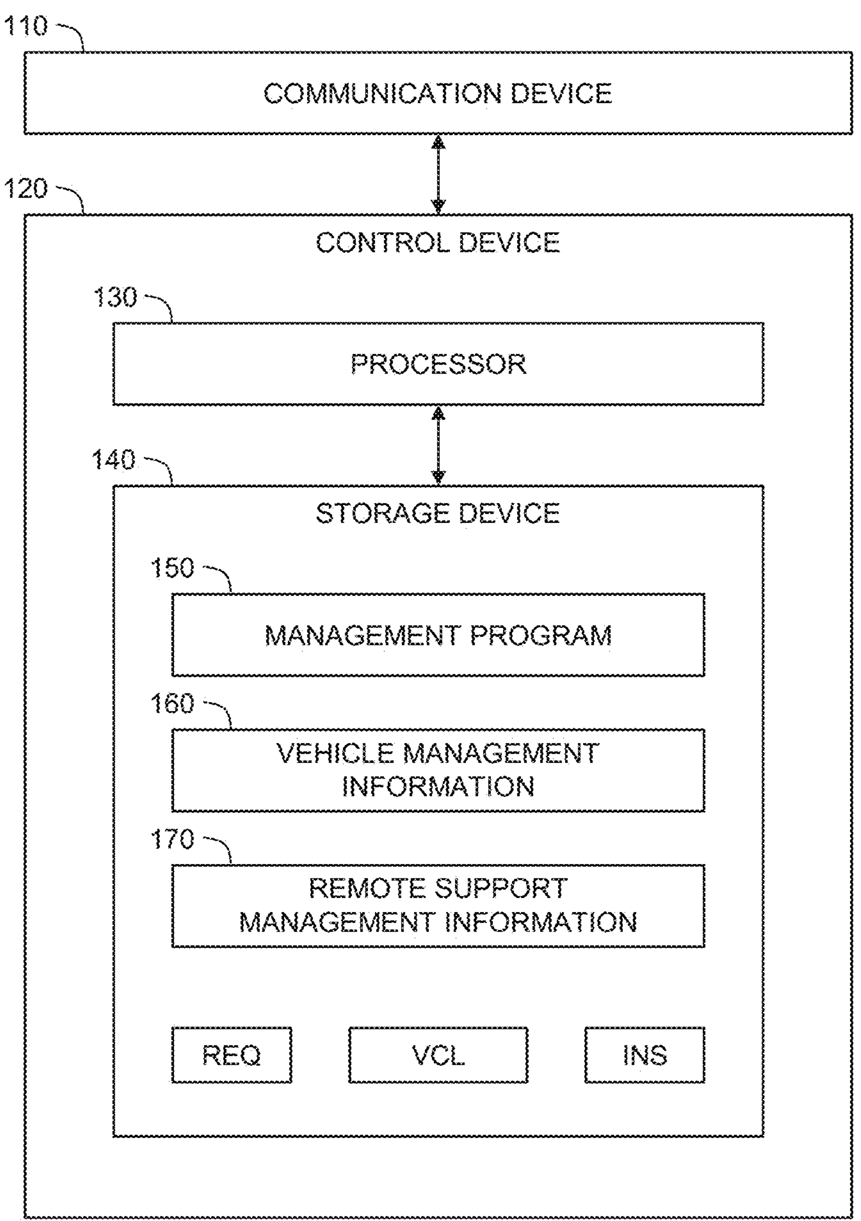
FIG. 3 is a block diagram showing an example of a configuration of a management system.

FIG. 3 is a block diagram illustrating an example of a configuration of the management system 100. The management system 100 includes a communication device 110 and a control device 120.

The communication device 110 communicates with the vehicle 10 and the remote operator terminal 200.

The control device (controller) 120 controls the management system 100. The control device 120 includes one or more processors 130 (hereinafter, simply referred to as a processor 130 or processing circuitry) and one or more storage devices 140 (hereinafter, simply referred to as a storage device 140). The processor 130 executes a variety of processing. For example, the processor 130 includes a CPU. The storage device 140 stores a variety of information. Examples of the storage device 140 include a volatile memory, a nonvolatile memory, an HDD, an SSD, and the like.

A management program 150 is a computer program executed by the processor 130. The functions of the control device 120 may be implemented by a cooperation between the processor 130 executing the management program 150 and the storage device 140. The management program 150 is stored in the storage device 140. Alternatively, the management program 150 may be recorded on a non-transitory computer-readable recording medium. The management program 150 may be provided via a network.

Vehicle management information 160 is information for managing the vehicle 10 used for the mobility service. For example, the vehicle management information 160 includes an operation schedule of the vehicle 10. As another example, the vehicle management information 160 includes an operation state of the vehicle 10. The operation state of the vehicle 10 includes the position and the vehicle state of the vehicle 10, and is obtained from the vehicle information VCL described above. The vehicle management information 160 is stored in the storage device 140.

Remote support management information 170 is information for managing the remote support for the vehicle 10. For example, the remote support management information 170 includes identification (ID) information of the remote operator O and the remote operator terminal 200, a correspondence relationship between the remote operators O and the remote operator terminals 200, a state of the remote operator O (i.e, available or assigned), and the like. Moreover, the remote support management information 170 includes identification (ID) information of the target vehicle 10T, the number of support requests REQ, a content (task) of each support request REQ, and the like. Furthermore, the remote support management information 170 includes information on an assignment relationship between the target vehicle 10T and the assigned operator OA (the assigned operator terminal 200A). The remote support management information 170 is stored in the storage device 140.

The control device 120 receives the support request REQ from the target vehicle 10T via the communication device 110. The control device 120 executes the "operator assignment process" in response to the support request REQ. More specifically, the control device 120 searches for an available remote operator O based on the remote support management information 170. The control device 120 then assigns the available remote operator O to the target vehicle 10T. The control device 120 reflects the result of the operator assignment process in the remote support management information 170.

When the remote support for the target vehicle 10T is completed, the control device 120 cancels the assignment of the assigned operator OA to the target vehicle 10T. Then, the control device 120 updates the remote support management information 170.

2. Types of Remote Support

The remote support for the target vehicle 10T performed by the remote operator O (i.e., the assigned operator OA) includes "driving support" for supporting the driving of the target vehicle 10T. That is, the remote operator O performs the driving support in place of a driving entity (e.g., a driver, an autonomous driving system) of the target vehicle 10T. It can also be said that the driving support is travel support for supporting the traveling of the target vehicle 10T. Typically, the remote operator O supports at least one of the recognition process, the action decision process, and the timing decision process described above.

For example, the remote operator O supports a start of the target vehicle 10T at an intersection and the like. That is, the remote operator O decides whether or not the target vehicle 10T can start, and instructs the target vehicle 10T to start moving. As another example, the remote operator O may recognize a situation (for example, an obstacle, a signal indication, and the like) around the target vehicle 10T and notify the target vehicle 10T of a result of the recognition. As still another example, the remote operator O may recognize a situation (for example, an obstacle, a signal indication, and the like) around the target vehicle 10T and give an instruction of appropriate vehicle control according to a result of the recognition. The notification or the instruction from the remote operator O is transmitted to the target vehicle 10T as the operator instruction INS.

In the case of the mobility service using the vehicle 10, the remote operator O may be requested to perform various operations or passenger supports in place of a conductor. That is, the remote support requested to the remote operator O in the case of the mobility service may include not only the "driving support" described above but also "service support" performed in place of a conductor. Examples of the service support include opening or closing of the door 50 of the target vehicle 10T, confirming safety in a vehicle cabin of the target vehicle 10T, communicating with a passenger in the target vehicle 10T, and the like. The target vehicle 10T requests the remote operator O to perform at least one of opening or closing of the door 50 of the target vehicle 10T, confirming safety in the vehicle cabin of the target vehicle 10T, communicating with the passenger in the target vehicle 10T, and the like, as necessary.

For example, when the control device 70 of the target vehicle 10T is not able to determine whether the door 50 can be opened or closed by itself, the control device 70 requests the remote operator O to open or close the door 50. The remote operator O is able to check a situation around the target vehicle 10T and a situation in the vehicle cabin of the target vehicle 10T based on the vehicle information VCL (particularly, the image) transmitted from the target vehicle 10T. After checking the situation, the remote operator O instructs the target vehicle 10T to open or close the door 50. The control device 70 of the target vehicle 10T opens or closes the door 50 of the target vehicle 10T in accordance with the operator instruction INS indicating the instruction from the remote operator O.

As another example, the control device 70 of the target vehicle 10T detects abnormality in the vehicle cabin of the target vehicle 10T based on the image captured by the interior camera of the target vehicle 10T. Then, the control device 70 of the target vehicle 10T requests the remote operator O to confirm safety in the vehicle cabin. The remote operator O is able to check (confirm) safety in the vehicle cabin of the target vehicle 10T based on the vehicle information VCL (particularly, the image of the vehicle cabin) transmitted from the target vehicle 10T.

As yet another example, the control device 70 of the target vehicle 10T may request the remote operator O to communicate with a passenger in the target vehicle 10T. The remote operator O is able to communicate with the passenger in the target vehicle 10T via the input/output device 60 (e.g., speaker, microphone) of the target vehicle 10T.

Hereinafter, a technique useful when the driving support requested from the target vehicle 10T is the "service support" will be described.

3. Technique Useful for Service Support

3-1. Notification Waiting Process

The control device 70 of the vehicle 10 is able to issue (output) various notifications to the passenger in the vehicle 10 via the output device (e.g., display, speaker) of the input/output device 60. For example, the control device 70 of the vehicle 10 displays a visual notification on the display. As another example, the control device 70 of the vehicle 10 may output an audio notification from a speaker.

As an example, a door opening/closing notification regarding opening/closing of the door 50 of the vehicle 10 will be considered. Examples of the door opening/closing notification include "door is closing," "door is opening," "please step back a little because door is opening," and the like. When the control device 70 of the vehicle 10 determines to open or close the door 50, the control device 70 issues (outputs) the door opening/closing notification via the output device. Alternatively, the control device 120 of the management system 100 may determine to open or close the door 50 of the vehicle 10 and instruct the vehicle 10 to open or close the door 50. In this case also, the control device 70 of the vehicle 10 issues (outputs) the door opening/closing notification via the output device. Information on the door opening/closing notification is stored in advance in the storage device 90 of the vehicle 10, for example. Alternatively, the information on the door opening/closing notification may be transmitted from the management system 100 to the vehicle 10.

Meanwhile, the control device 70 of the vehicle 10 may request the remote operator O to open or close the door 50. In this case, the opening or closing of the door 50 of the vehicle 10 is consistent with the content of the service support that is requested of the remote operator O. The door opening/closing notification described above serves as a notification for explaining the content of service support that is requested of the remote operator O. That is to say, the door opening/closing notification is a notification related to the service support that is requested of the remote operator O. Regarding such a situation, the inventor of the present application has found the following problem.

Figure 4:
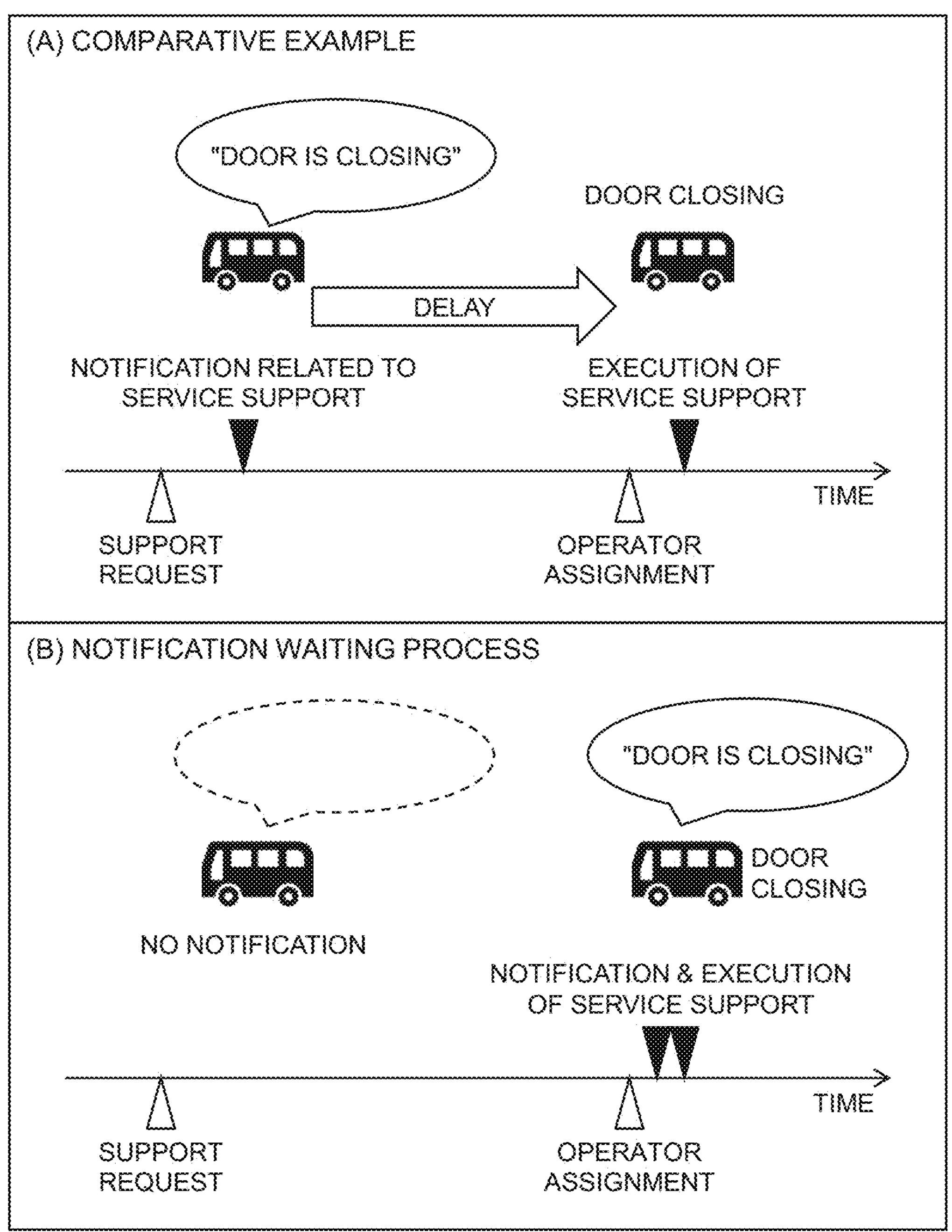
FIG. 4 is a conceptual diagram for explaining a notification waiting process.

The problem will be described with reference to a comparative example shown in (A) in FIG. 4. At a timing when the target vehicle 10T issues a request for the service support, there is no available remote operator O and thus no remote operator O is assigned to the target vehicle 10T. According to the comparative example, a notification related to the service support is issued at the stage where no remote operator O is assigned to the target vehicle 10T. Thereafter, after an elapse of a certain period of time from the request for the service support, a remote operator O is assigned to the target vehicle 10T. Then, the assigned operator OA performs the service support with respect to the target vehicle 10T (for example, closing the door 50). That is to say, the service support requested from the target vehicle 10T is actually executed after an elapse of a certain period of time from the issuance of the notification related to the service support. Therefore, for example, after the notification "door is closing" is issued, a situation where nothing occurs continues for a while, and then the door 50 is actually closed. The passenger in the target vehicle 10T may feel senses of anxiety or strangeness against such the situation.

As described above, when the notification related to the service support is issued during a period from the request for the service support to the assignment of the remote operator O to the target vehicle 10T, the passenger in the target vehicle 10T may feel senses of anxiety or strangeness.

In order to solve such the problem, the management system 100 according to the present embodiment is configured to execute a "notification waiting (standby) process." More specifically, the control device 120 of the management system 100 prohibits a notification related to the service support from being issued to the passenger in the target vehicle 10T until a remote operator O is assigned to the target vehicle 10T. The prohibition instruction is transmitted from the management system 100 to the target vehicle 10T. In accordance with the prohibition instruction, the control device 70 of the target vehicle 10T waits without issuing a notification related to the service support. Thereafter, when a remote operator O is assigned to the target vehicle 10T, the control device 120 of the management system 100 permits the notification related to the service support to be issued to the passenger in the target vehicle 10T. The permission instruction is transmitted from the management system 100 to the target vehicle 10T. In accordance with the permission instruction, the control device 70 of the target vehicle 10T issues a notification related to the service support. Thus, a gap between a timing of the notification related to the service support and an execution timing of the service support is suppressed. As a result, it is possible to suppress the senses of anxiety and strangeness felt by the passenger in the target vehicle 10T.

Figure 5:
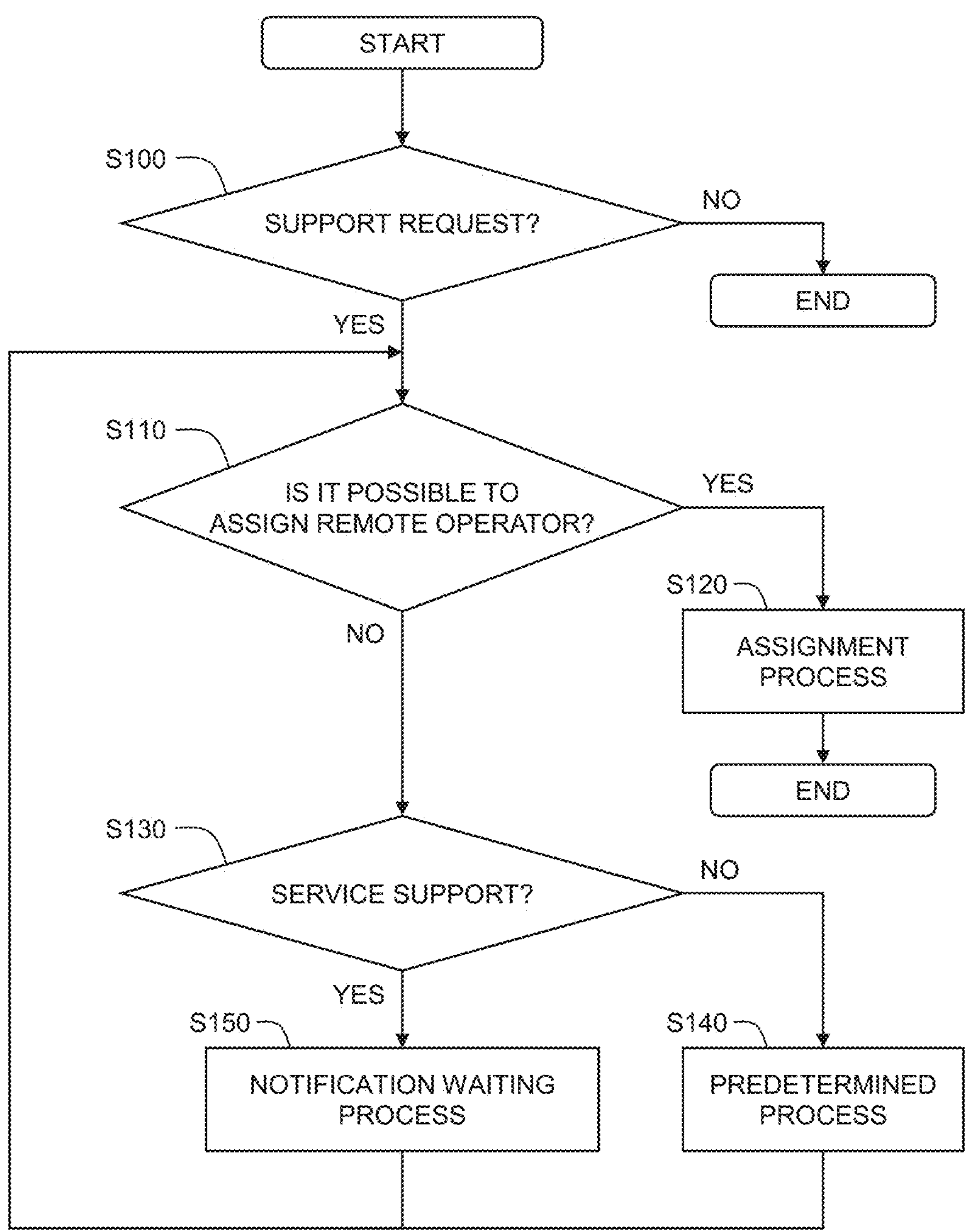
FIG. 5 is a flowchart showing an example of processing executed by a management system.

FIG. 5 is a flowchart illustrating an example of processing performed by the management system 100. In Step S100, it is determined whether or not the management system 100 receives a new support request REQ from a vehicle 10. When the management system 100 receives a new support request REQ (Step S100; Yes), the processing proceeds to Step S110.

In Step S110, the management system 100 checks availability of the remote operators O based on the remote support management information 170. When the number of available remote operators O exceeds the number of unassigned support requests REQ, it is possible to assign a remote operator O with respect to the new support request REQ. When it is possible to assign a remote operator O to the new support request REQ, that is, when there is an available remote operator O (Step S110; Yes), the processing proceeds to Step S120. In Step S120, the management system 100 assigns the available remote operator O to the target vehicle 10T.

On the other hand, when it is not possible to assign a remote operator O to the new support request REQ, that is, when there is no available remote operator O (Step S110; No), the processing proceeds to Step S130. In Step S130, the management system 100 determines whether or not the requested remote support is the service support based on the content of the support request REQ.

When the requested remote support is not the service support but the driving support (Step S130; No), the processing proceeds to Step S140. In Step S140, the management system 100 executes a predetermined process. Various examples can be considered as countermeasures in the case where there is no available remote operator O at the timing when the driving support is requested, but since these are not the target of the present disclosure, the description thereof will be omitted here.

On the other hand, when the requested remote support is not the driving support but the service support (Step S130; Yes), the processing proceeds to Step S150. In Step S150, the management system 100 executes the notification waiting process. That is, the management system 100 prohibits a notification related to the service support from being issued to the passenger in the target vehicle 10T. The management system 100 instructs the target vehicle 10T to prohibit the notification. After that, the processing returns to Step S110.

When any remote operator O becomes available after the start of the notification waiting process, the management system 100 assigns the available remote operator O to the target vehicle 10T (Step S120). Then, the management system 100 permits the notification related to the service support to be issued to the passenger in the target vehicle 10T. The management system 100 instructs the target vehicle 10T to permit the notification.

As described above, according to the present embodiment, the notification waiting process is executed when the remote support requested from the target vehicle 10T that provides the mobility service is the service support different from the driving support. In the notification waiting process, the notification related to the service support is prohibited from being issued to the passenger in the target vehicle 10T until the remote operator O is assigned to the target vehicle 10T. Thus, a gap between a timing of the notification related to the service support and an execution timing of the service support is suppressed. As a result, it is possible to suppress the senses of anxiety and strangeness felt by the passenger in the target vehicle 10T.

3-2. Waiting Message

Figure 6:
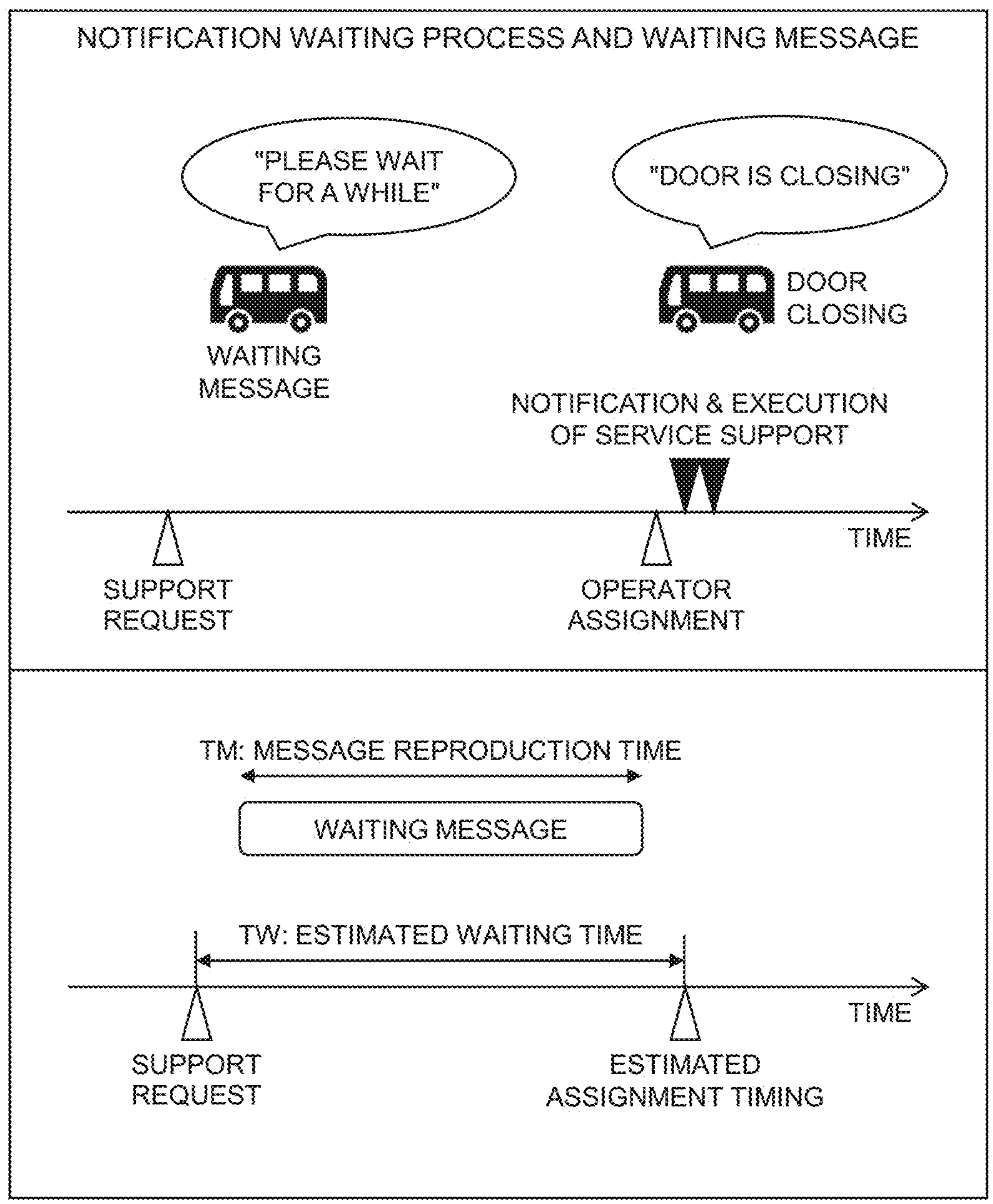
FIG. 6 is a conceptual diagram for explaining a waiting message.

FIG. 6 is a conceptual diagram for explaining the notification waiting process and a waiting message. During execution of the notification waiting process, the passenger in the target vehicle 10T may feel some anxiety or strangeness about nothing occurring. Therefore, during execution of the notification waiting process, the management system 100 may instruct the target vehicle 10T to issue (output) a waiting message to the passenger in the target vehicle 10T. Examples of the waiting message include "Please wait for a while", "Checking the status now," and the like.

Information of the waiting message is stored in advance in the storage device 90 of the vehicle 10. Alternatively, the information of the waiting message may be transmitted from the management system 100 to the target vehicle 10T. The control device 70 of the target vehicle 10T issues (outputs) the waiting message to the passenger through the output device (e.g., display device, speaker) of the input/output device 60. The waiting message may be a visual message displayed on the display or may be an audio message output from the speaker. Issuing the waiting message makes it possible to suppress the passenger's senses of anxiety and strangeness during the notification waiting process.

When any remote operator O becomes available during reproduction of the waiting message, the waiting message (e.g., "Please wait for a while") and the service support notification (e.g., "Door is closing") may overlap with each other. Alternatively, the waiting message may be interrupted in the middle, and the service support notification may begin subsequently. For example, when the waiting message ends with "Please wa . . . " and then "Door is closing" follows, the message becomes an unnatural message such as "Pleas wa-door is closing." In particular, in the case of the audio message, there is a possibility that the waiting message and the service support notification are hard to hear or sound unnaturally.

In view of the above, the management system 100 may determine whether or not to reproduce the waiting message in consideration of a waiting time to the operator assignment. More specifically, the control device 120 of the management system 100 estimates a waiting time TW until the remote operator O is assigned to the target vehicle 10T, based on the remote support management information 170. The remote support management information 170 includes the state of each remote operator O and the content (task) of each support request REQ. Therefore, by referring to the remote support management information 170, it is possible to estimate the waiting time TW until the remote operator O is assigned to the target vehicle 10T. A record database indicating association of the past remote support management information 170 and the record of the waiting time TW at that time may be accumulated. Using the record database and the current remote support management information 170 makes it possible to increase accuracy of the estimation of the waiting time TW.

A message reproduction time TM is a reproduction time of the waiting message. Information on the message reproduction time TM is registered in the management system 100 or the vehicle 10 in advance. The management system 100 compares the estimated waiting time TW with the message reproduction time TM. When the estimated waiting time TW is equal to or longer than the message reproduction time TM, the management system 100 instructs the target vehicle 10T to issue the waiting message to the passenger during execution of the notification waiting process. On the other hand, when the estimated waiting time TW is less than the message reproduction time TM, the management system 100 refrains from issuing the waiting message during execution of the notification waiting process. That is to say, the management system 100 instructs the target vehicle 10T not to issue the waiting message.

A plurality of waiting message candidates having different message reproduction times TM may be prepared in advance. In this case, the management system 100 selects one of the plurality of waiting message candidates whose message reproduction time TM is equal to or less than the estimated waiting time TW. For example, the management system 100 selects one waiting message candidate having the longest message reproduction time TM that is equal to or shorter than the estimated waiting time TW. Then, the management system 100 instructs the target vehicle 10T to issue the selected waiting message to the passenger. Alternatively, the management system 100 may notify the target vehicle 10T of the estimated waiting time TW. The vehicle 10T may select one of the plurality of waiting message candidates whose message reproduction time TM is equal to or less than the estimated waiting time TW. In either case, the control device 70 of the target vehicle 10T is able to issue (output) the waiting message whose message reproduction time TM is equal to or less than the estimated waiting time TW. This makes it possible to prevent the waiting message from being difficult to hear or unnatural.

When the estimated waiting time TW is still sufficient after the end of the reproduction of one waiting message, the same or another waiting message may be reproduced.

What is claimed is:

1. A mobility service system for providing a mobility service using a vehicle, the mobility service system comprising:

processing circuitry configured to assign a remote operator to a target vehicle in response to a request for remote support from the target vehicle, wherein the remote support includes service support different from support of vehicle driving, the service support includes confirming safety in a vehicle cabin of the target vehicle and communicating with a passenger in the target vehicle, when the remote support requested from the target vehicle is the service support, the processing circuitry is further configured to execute a notification waiting process that prohibits a notification related to the service support from being issued to the passenger in the target vehicle until the remote operator is assigned to the target vehicle, the processing circuitry is further configured to check availability of remote operators based on remote support management information, the remote support management information includes identification information of the remote operator and a remote operator terminal, a correspondence relationship between the remote operator and the remote operator terminal, a state of the remote operator, a number of support requests, a content of each support request, identification information of the target vehicle, and information on an assignment relationship between the target vehicle and the assigned operator, and the processing circuitry is further configured to assign the remote operator with respect to a new support request in response to a number of available remote operators exceeding a number of unassigned support requests.

2. The mobility service system according to claim 1, wherein the processing circuitry is further configured to issue a waiting message to the passenger in the target vehicle during execution of the notification waiting process.

3. The mobility service system according to claim 1, wherein the processing circuitry is further configured to:

estimate a waiting time until the remote operator is assigned to the target vehicle;

when the estimated waiting time is equal to or longer than a reproduction time of a waiting message, issue the waiting message to the passenger in the target vehicle during execution of the notification waiting process; and when the estimated waiting time is less than the reproduction time of the waiting message, refrain from issuing the waiting message during execution of the notification waiting process.

4. The mobility service system according to claim 1, wherein the processing circuitry is further configured to:

estimate a waiting time until the remote operator is assigned to the target vehicle;

select one of a plurality of waiting message candidates whose reproduction time is equal to or less than the waiting time; and issue the selected one waiting message to the passenger in the target vehicle during execution of the notification waiting process.

* * * * *